United States Patent [19]

Lyon

[11] Patent Number: 5,581,657

[45] Date of Patent: Dec. 3, 1996

[54] SYSTEM FOR INTEGRATING MULTIPLE GENETIC ALGORITHM APPLICATIONS

[75] Inventor: Bruce C. Lyon, Victor, N.Y.

[73] Assignee: Zerox Corporation, Stamford, Conn.

[21] Appl. No.: 282,448

[22] Filed: Jul. 29, 1994

[51] Int. Cl.⁶ .................................................. G06F 15/18
[52] U.S. Cl. ............................................................. 395/13
[58] Field of Search ............................ 395/13; 364/468, 364/496

[56] References Cited

U.S. PATENT DOCUMENTS

| | | | |
|---|---|---|---|
| 5,148,513 | 9/1992 | Koza et al. ................................ | 395/13 |
| 5,245,696 | 9/1993 | Stork et al. ............................... | 395/13 |
| 5,249,259 | 9/1993 | Harvey ...................................... | 395/13 |
| 5,255,345 | 10/1993 | Shaefer ..................................... | 395/13 |
| 5,343,554 | 8/1994 | Koza et al. ............................... | 395/13 |
| 5,390,282 | 2/1995 | Koza et al. ............................... | 395/13 |
| 5,390,283 | 2/1995 | Eshelman et al. ........................ | 395/13 |
| 5,394,509 | 2/1995 | Winston ................................... | 395/13 |
| 5,428,709 | 6/1995 | Banzhaf .................................... | 395/13 |
| 5,434,796 | 7/1995 | Weininger ................................ | 364/496 |
| 5,495,419 | 2/1996 | Rostoker et al. ......................... | 364/468 |

OTHER PUBLICATIONS

Hitchhikers Guide to Evolutionary Computing (1993) by Jorg Heitkoetter of The University of Dortmund, Dec. 20, 1993.

Genetic Algorithms For Optimization: Three Case Studies (New York: IEEE Neutral Networks Council, 1994).

Primary Examiner—Robert W. Downs
Assistant Examiner—Sanjiv Shah
Attorney, Agent, or Firm—Robert Hutter

[57] ABSTRACT

A genetic algorithm-based system for selecting a solution. Means are provided for evaluating solutions according to a preselected evaluation function. A first computer generates a first population of solutions, the first population of solutions being of a first representation scheme. A second computer generates a second population of solutions, the second population of solutions being of a second representation scheme. A translator translates solutions of the second representation scheme into equivalent solutions of the first representation scheme. Means are provided for introducing solutions from the second population into the first population of solutions.

10 Claims, 5 Drawing Sheets

| LINK COSTS | | |
|---|---|---|
| ab 4 | bc 4 | ce 8 |
| ac 5 | bd 8 | cf 10 |
| ad 6 | be 12 | de 5 |
| ae 9 | bf 11 | df 12 |
| af 15 | cd 6 | de 7 |

SYSTEM FOR INTEGRATING MULTIPLE GENETIC ALGORITHM APPLICATIONS

The present invention is directed to a versatile system for integrating multiple genetic algorithm programs using diverse solution representations which can be readily carried out on one or on many independent computers.

"Genetic algorithms" is the name of a technique currently gaining acceptance for finding best solutions to complex multivariable problems. In one sense, genetic algorithms represent a focused and progressive form of trial and error. For example, if the problem is to find an optimal configuration for connecting nine major nodes in a network, or connecting nine cities with an airline, there would be 68 billion possible topologies, that is, unique sets of possible solutions, perhaps only one of which would be "best," given a sufficiently precise definition of the criteria for a "good" system. If conventional optimization techniques are cumbersome or not readily applicable, as often happens in the real world, one "brute force" technique would be to go through all 68 billion possible combinations, feed them into an algorithm reflective of desired evaluation criteria and then choose the combination that provided the best result. With genetic algorithms, however, this basic trial-and-error technique can be made more rational and systematic.

Genetic algorithms were first described by Holland, whose book Adaptation in Natural and Artificial Systems (Cambridge, MA: MIT Press, 1992), is currently deemed the most comprehensive work on the subject. Genetic algorithms are computer programs that solve search or optimization problems by simulating the process of evolution by natural selection. Regardless of the exact nature of the problem being solved, a typical genetic algorithm cycles through a series of steps as follows:

Initialization: A population of potential solutions is generated. "Solutions" are discrete pieces of data which have the general shape (e.g., the same number of variables) as the answer to the problem being solved. For example, if the problem being considered is to find the best six coefficients to be plugged into a large empirical equation, each solution will be in the form of a set of six numbers, or in other words a 1×6 matrix or linked list. These solutions can be easily handled by a digital computer. Often, initialization produces solutions that are scattered at random throughout the search space, such as by starting out with solutions comprising six random numbers each.

Rating: A problem-specific evaluation function is applied to each solution in the population, so that the relative acceptability of the various solutions can be assessed.

Selection of parents: Solutions are selected to be used as parents of the next generation of solutions. Typically, as many parents are chosen as there are members in the initial population. The chance that a solution will be chosen to be a parent is related to the results of the evaluation of that solution: better solutions are more likely to be chosen as parents. Usually, the better solutions are chosen as parents multiple times, so that they will be the parents of multiple new solutions, while the poorer solutions are not chosen at all.

Pairing of parents: The parent solutions are formed into pairs. The pairs are often formed at random, but in some implementations dissimilar parents are matched to promote diversity in the children.

Generation of children: Each pair of parent solutions is used to produce two new children. Either a mutation operator is applied to each parent separately to yield one child from each parent, or the two parents are combined using a recombination operator, producing two children which each have some similarity to both parents. To take the six-variable example, one simple recombination technique would be to have the solutions in each pair merely trade their last three variables, thus creating two new solutions (and the original parent solutions may be allowed to survive). Thus, a child population the same size as the original population is produced. The use of recombination operators is a key difference between genetic algorithms and almost any other optimization or search technique. Recombination operating generation after generation ultimately combines the "building blocks" of the optimal solution that have been discovered by successful members of the evolving population into one individual. In addition to recombination techniques, mutation operators work by making a random change to a randomly selected component of the parent, and can be used to create children "asexually."

Rating of children: The members of the new child population are evaluated. Since the children are modifications of the better solutions from the preceding population, some of the children may have better ratings than any of the parental solutions.

Combining the populations: The child population is combined with the original population that the parents came from to produce a new population. One simple way to do this is to accept the best half of the solutions from the union of the child population and the source population. Thus, the total number of solutions stays the same, but the average rating can be expected to improve if superior children were produced. Note that any inferior children that were produced will be lost at this stage, and that superior children will become the parents of the next generation in step 3.

Check for termination: If the program is not finished, steps 3 through 7 are repeated. The program can end if a satisfactory solution (i.e., a solution with an acceptable rating) has been generated. More often, the program is ended when either a predetermined number of iterations has been completed, or when the average evaluation of the population has not improved after a large number of iterations.

In order to apply the genetic algorithm technique to a specific problem, such as job routing, circuit design, or control system design, only two problem-specific components are required to carry out the technique. These key elements are an evaluation function and a representation scheme. The evaluation function tests the quality of the solutions evolved by the genetic algorithm, based on the designer's knowledge of the problem to be solved. Most design or optimization problems involve tradeoffs between conflicting goals; the evaluation function must take these tradeoffs into account. A well-made evaluation function is crucial to the success of the system, since the genetic algorithm will shape the solution to fit the evaluation function. The representation scheme determines how the different possible solutions to the problem are represented as data structures in the genetic algorithm program. For example, in a parametric design problem one possible representation scheme would be a matrix or linked list, having slots for the values to be assigned to the different parameters of the object being designed. The representation chosen must be such that the different solutions can be systematically altered in various ways by the mutation and recombination operators of the genetic algorithm program. The chosen representation scheme should also allow the optimum solution to be represented, since the optimum will not be able to be evolved otherwise. This goal can be achieved by ensuring that the representation scheme chosen can represent any possible solution to the problem; such a representation scheme could be termed "complete." The genetic operators used with a given representation scheme should be "closed"

under that representation scheme; that is, if the genetic operators are applied to a solution that is a member of a given representation scheme's search space, then any resulting solutions should also be members of the same search space.

The nature of the representation chosen will determine how the evolution of a good solution proceeds. Each representation, along with its associated genetic operators, defines a search space, consisting of all of the possible distinct solutions that the representation scheme is capable of representing. In general, the larger the search space defined by the representation scheme, the longer the genetic algorithm will take to find the best solution, since most of the solutions in the search space will probably be of very low quality. However, if an alternate representation with a smaller search space is chosen, for example by placing constraints on the kinds of solutions that can be represented, it is possible that the best solution to the problem will be one that lies outside of the range of solutions that will be considered by the program; thus, a representation scheme that has a constrained search space may be "incomplete." The selection of a representation scheme therefore involves a tradeoff between speed and precision. Making this tradeoff properly is one of the most difficult tasks in designing a genetic algorithm to solve a particular problem. This invention is directed at avoiding the need to choose just one representation scheme.

The key advantage of the genetic algorithm technique is that it is useful for very large multivariable problems wherein: there are an enormous number of possible solutions; - only a small number of the possible solutions are useful; there are conflicting requirements that good solutions must meet; and in which it is not possible to prove that one particular solution is or is not the best one possible. Genetic algorithms apply the power of evolution by natural selection to the solution of such intractable problems. The systematic alteration techniques of recombination and mutation provide the ability to systematically search a wide range of possible solutions in a population, while the selection process provides a focus on the most promising areas of the population. Genetic algorithms have the advantage of global, as opposed to local, optimization, balancing of conflicting requirements, and usefulness even in the absence of any real understanding of the underlying physical properties of the problem being solved.

In genetic algorithm processes, there is available to a programmer any number of schemes for effecting the exchange of "genetic material" between pairs of solutions in a population. Many such techniques can improve on "nature." For example, if it is found that a particular tested solution in a population results in a particularly good score from the evaluation function, this solution can be "rewarded" by being artificially replicated before the pairing process, such as being copied into three or four identical individual solutions, so that this particularly good solution will have more of an influence on the next generation—that is, its good genes will be spread around more than solutions which were lower ranked. However, there is a general caution that, in any genetic-algorithm process, it is not desirable to converge too fast to an optimum solution. Particularly if the field of potential solutions is believed to include discontinuities and a number of local maxima, there will be a significant probability that the process will converge very rapidly on what is in fact merely a local maximum. This too-quick convergence to a local maximum is often caused by biasing the process too quickly toward the best solutions in the early populations, without giving the system as a whole the chance to sample a sufficiently large number of individual solutions. A compromise must be made between concluding that an optimum solution has been reached within a reasonable time, and being convinced that a sufficiently large number of solutions have been tested.

It is possible to design representation schemes that have separate "genotype" and "phenotype" components. In biological genetics, the genotype of an organism is the genetic material the organism inherited from its parents, whereas the phenotype of an organism is the organism's body and behavior, which are produced by the interaction of the genotype and the environment in the process of development. By analogy, the phenotype of a genetic algorithm representation scheme is the representation of the solution that is rated by the evaluation function and is displayed to the user. The genotype is the internal representation scheme that is manipulated by the genetic operators. The phenotype is derived from the genotype by an interpretation function, which could be considered analogous to the biological development of an organism according to the instructions encoded in the organism's DNA. The genotype could be considered the directions that are read by the interpretation function to guide the interpretation function in building the phenotype. Note that in the simplest case, the phenotype and genotype could be the same, so that the interpretation function would not be needed.

Generally speaking, the nature of the phenotype will be determined by the problem that must be solved and the information that will be required by the evaluation function. For example, in a genetic algorithm for computer network design, the phenotype of a network design could be the list of the links that compose the network, with their bandwidths. This is a complete representation, since all possible networks can be represented as lists of links between nodes. The evaluation function could rate this network phenotype, since the phenotype contains all of the information about the network that is needed to predict the network's performance and cost. This phenotype could be used in a genetic algorithm program without a separate genotype or interpretation function; the genetic operators of mutation and recombination would have to be written to operate directly on the lists of links and bandwidths. This phenotype-only scheme can be termed a "direct" representation scheme. The most straightforward genetic algorithm would thus entail the use of a complete and direct representation scheme. Relatively simple problems, such as evolving solutions to the Traveling Salesman Problem, are generally solved this way.

In an "indirect" representation scheme the genetic operators manipulate a separate genotype, which is translated to a phenotype by the interpretation function; this phenotype is then tested by the evaluation function. For each "direct" phenotype representation scheme with its corresponding evaluation function, it is possible to devise a number of "indirect" genotype representation schemes, each with its own interpretation function that can be used to map the genotype into a phenotype of the format required by the evaluation function. These indirect representations will be particularly useful if the designer has some knowledge of the likely properties of the optimum (or near-optimum) solution to the problem at hand, and constrains the genotype and interpretation function to produce only candidate solutions that are "near" the expected optimum. Typically, each of the many possible constrained representation schemes will have its own strengths and weaknesses. By using different populations of solutions, one with a direct, complete representation scheme and the others with various indirect representation schemes, it is possible to exploit the strengths of the constrained representations while compensating for their weaknesses. If a direct representation scheme is designed, and if several indirect representation schemes that translate their genotypes into phenotypes with the same format used by the direct scheme are designed, then solutions that are produced by genetic algorithm processes using the indirect representation schemes can be introduced into the populations that are being run by genetic algorithm processes using the direct representation. Thus, if the constrained, indirect representation schemes are incomplete (which is very likely), they may still be of use if they converge to the neighborhood of the correct solution quickly, and that near-optimum solution is then moved to a population that uses the direct representation and continues to evolve there. Note that although a solution generated by a more constrained representation can always be moved to a population with a less constrained representation, the reverse will not usually be possible, since more constrained representations are more incomplete and will not usually be able to represent all of the possible solutions in the search space of less constrained representation schemes.

In any practical discussion of genetic algorithms, there is one point that cannot be avoided: genetic algorithm applications consume enormous amounts of computer time. Indeed, in the future, further decreases in the cost of computer power will probably only be matched by further increases in the complexity of genetic algorithm applications. Thus, a fact of life for anyone using genetic algorithm techniques is the quest for efficient use of available computer power. In practical situations, it is common to require the genetic algorithm application to "sponge" computer power from other computers which are not being used at the moment, as at night. Because practical genetic algorithm applications tend to rely heavily on borrowed computer power, there is an advantage to be had in a technique which can be divided into separate modules, each module being the "property" of an individual computer, which will require a minimum amount of interaction between computers, and will also permit non-catastrophic pauses in the application program when certain computers involved have to be used for other purposes.

U.S. Pat. No. 5,148,513 discloses a genetic process for problem solving using co-evolving populations of entities. An activated entity in one of the populations produces a result, which is assigned a value, and the value is associated with the producing entity. The value is then computed relative to the performance of entity in a different population. Then, entities having relatively high associated values are selected from the evolving population, and performed either crossover or fitness proportionate reproduction.

U.S. Pat. No. 5,245,696 discloses a computer method for implementing a neural network to effect a desired relationship between inputs representing real world phenomena and outputs corresponding to the inputs. Each of the various interconnections in a proposed neural network is assigned a weight value, and then various techniques are applied to the proposed interconnection to optimize the weight values.

U.S. Pat. No. 5,249,259 discloses a genetic algorithm technique, wherein the set of possible values is organized in a matrix where rows and columns correspond to elements in a universe of elements.

U.S. Pat. No. 5,255,345 discloses a genetic algorithm optimization method wherein "tokens" take on values that represent trial solutions in accordance with a representation scheme which defines relationships between given token values and corresponding trial solutions. The values of the tokens are iteratively changed to explore a solution space and converge on a best solution.

The article by Davis, "Genetic Algorithms for Optimization: Three Case Studies," in Zurada, et al., eds., Computational Intelligence: Imitating Life (New York: IEEE Neural Networks Council, 1994) describes examples of genetic-algorithm applications using direct and indirect representation schemes.

The most complete compendium of activity in the field of genetic algorithms as of the filing hereof is the publicly-accessible electronic document known as The Hitchhiker's Guide to Evolutionary Computing, edited until the end of 1993 by Jorg Heitkoetter at the University of Dortmund. Transactions after this date are intended to be accessible via SAFIER, "The Santa Fe Institute's Evolutionary computation Repository," accessible on Internet via anonymous ftp to ftp.santafe.edu as /pub/EC/FAQ/hhgtec-1.10.gs.gz.

According to the present invention, there is provided a system for selecting a solution. Means are provided for evaluating solutions according to a preselected evaluation function. A first computer or set of computers generates and maintains one or more populations of solutions, all of which use a complete, direct representation scheme. A second computer or set of computers generates and maintains a second population or set of populations of solutions, with each population using a (possibly unique) indirect, constrained representation scheme. A translator translates solutions of the constrained representation schemes into equivalent solutions of the direct representation scheme. Means are provided for introducing translated solutions from the constrained populations into the first population of solutions.

Figure 5A:
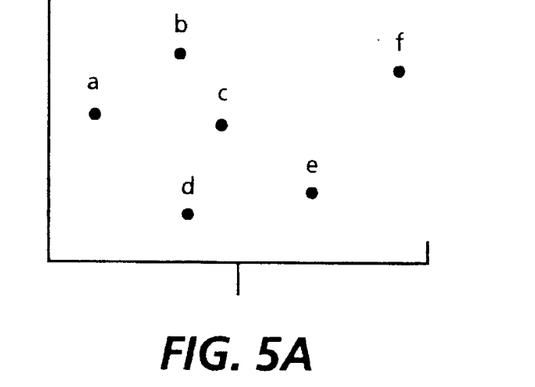
FIGS. 5A–C are a set of diagrams and a table illustrating the difference between phenotype and genotype solutions as applied to an example genetic-algorithm application.

As an example of the difference between genotype and phenotype solutions in the context of genetic algorithms, and of how several different genotypes can map to the same phenotype, consider the problem of evolving a WAN (wide-area network) to connect six nodes. Such a problem is illustrated in FIG. 5A and its accompanying table in FIG. 5B, which shows arbitrary costs associated with connecting each pair of nodes in FIG. 5A. Suppose that the goal is to connect together all of the nodes at the least cost. The "best" network in this case would connect all six nodes using the least expensive subset of the fifteen possible links between pairs of nodes.

Figure 5B:
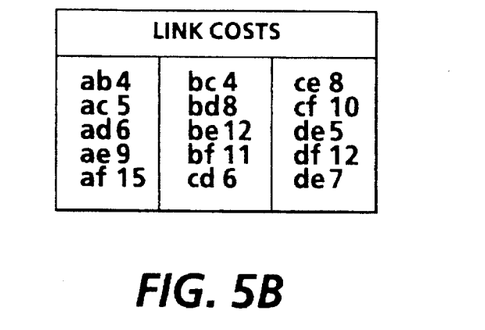

The phenotype for this problem would be the list of the links that make up the network, along with their costs. The evaluation function would check to see that all of the nodes are connected, and add up the costs of the links to get the total cost. Some form of penalty could be applied to networks that are not connected. The goal of the genetic algorithm would be to minimize the total cost plus penalty.

Figure 5C:
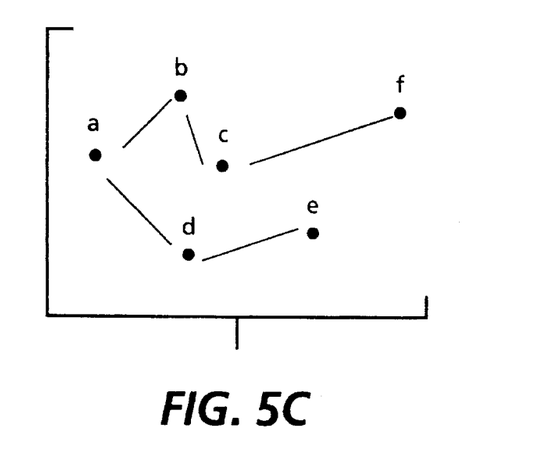

One possible genotype scheme for this problem would be to have a single, variable length chromosome consisting of a list of the links that are to be included in the network, such as shown in FIG. 5C. Each network would thus be a list with zero to 15 elements. The genetic operators for this representation could add or subtract links, and recombine links from two parental networks to produce child networks. A list of nodes illustrating the particular solution shown in FIG. 5C would look like "cf, bc, de, ad, ab." Note that these genetic operators would have to be designed to avoid producing networks with duplicate links. Also note that, unless the links are sorted according to some fixed scheme, there can be more than one genotype corresponding to the same phenotype, since the links in the actual network are not ordered. This could be considered a direct and complete representation, since any possible network can be represented, and the genotype corresponding to any given network can be determined.

Another possible direct and complete genotype scheme could use fixed-length binary chromosomes consisting of 15 bits. Each bit would map to one of the 15 possible links; a '1' at that position would indicate that the link should be included in the network, and a '0' would indicate that that link is to be omitted. Thus, a typical solution would be rendered as a 15-bit binary number such as '011001000001100.' Mutation operators for this representation would simply flip bits from '1' to '0' or vice-versa; recombination operators could just swap corresponding segments of the parental strings to produce child strings. Note that the genetic operators for this genotype scheme would never be in danger of duplicating links within one network, nor do any two genotypes map to the same phenotype.

In both of the genotype representation schemes above, the number of possible disconnected networks is much greater than the possible number of connected networks. That is, most of the search space is occupied by "solutions" of little interest. It is possible to devise indirect genotype representation schemes that can only represent connected networks. For example, one possible indirect representation could use a single chromosome that is a permutation of the six nodes, so that the solution shown in FIG. 5C would be rendered "fcbade" (as can be seen, simply a list of the nodes, in order, along the single line). A "development" function could produce a network from such a list of nodes by connecting the second node to the first node, the third to the second, and so on. This would guarantee that the resulting network would be connected. Mutation and recombination operators for permuted lists are easy to design. Note that this indirect representation cannot represent all possible networks; for example, it cannot produce a "star" network topology.

Another possible indirect genotype scheme could have two chromosomes; one, a permuted list as in the previous example, and the other a single integer between 2 and 6. If the value of the integer is N, then the first N nodes in the list would be connected together as in the previous representation; then the other nodes could be connected, in order, to the least expensive to reach already connected node. In this way the solution of FIG. 5C would look something like "cbadfe-4". This representation could use the same genetic operators as the previous example for the list chromosome; for the integer chromosome, mutation could be addition or subtraction and recombination could involve averaging. Note that the "development" function for this representation uses some problem knowledge (the costs of the links). Also note that it would be very difficult to determine whether any particular network could be produced by this representation or not.

It is important to realize that all four of these schemes can produce networks with the same phenotype (a list of links and their costs), which could be evaluated by the same evaluation function. Also, since the first and second representations are direct, a phenotype produced by one of the other representation schemes could be "reverse engineered" to one of those two direct representations and mated with a solution generated by that direct representation.

Figure 1:
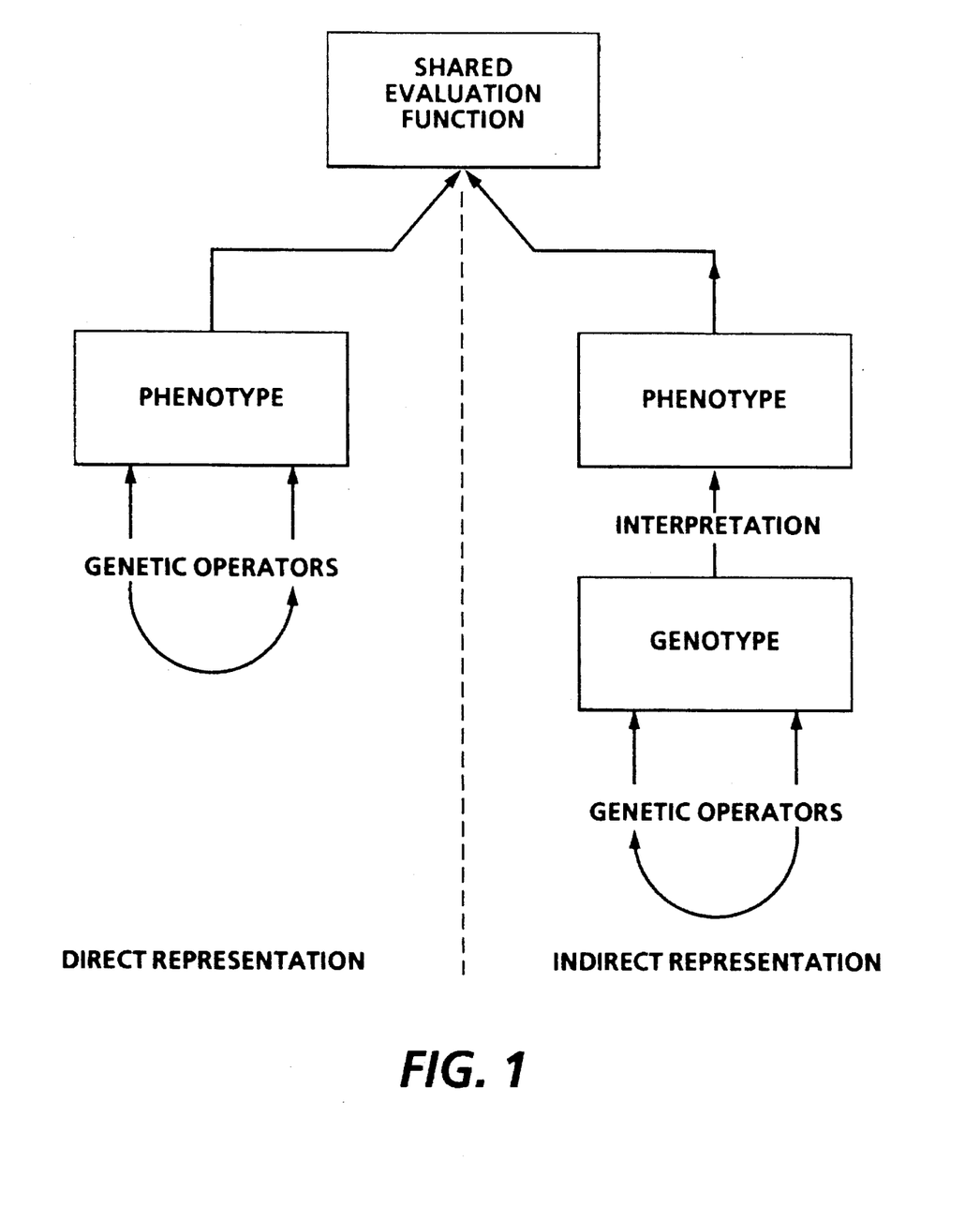
FIG. 1 is a diagram showing the interaction of phenotype and genotype solutions in a genetic-algorithm application as carried out in the system of the present invention.

FIG. 1 shows the relationship between direct and indirect representation schemes that share the same evaluation function. Note that in the direct representation, the genetic operators of mutation and recombination manipulate the phenotype directly, while in the indirect representation the genetic operators manipulate the genotype, and thus only effect the phenotype indirectly.

Figure 2:
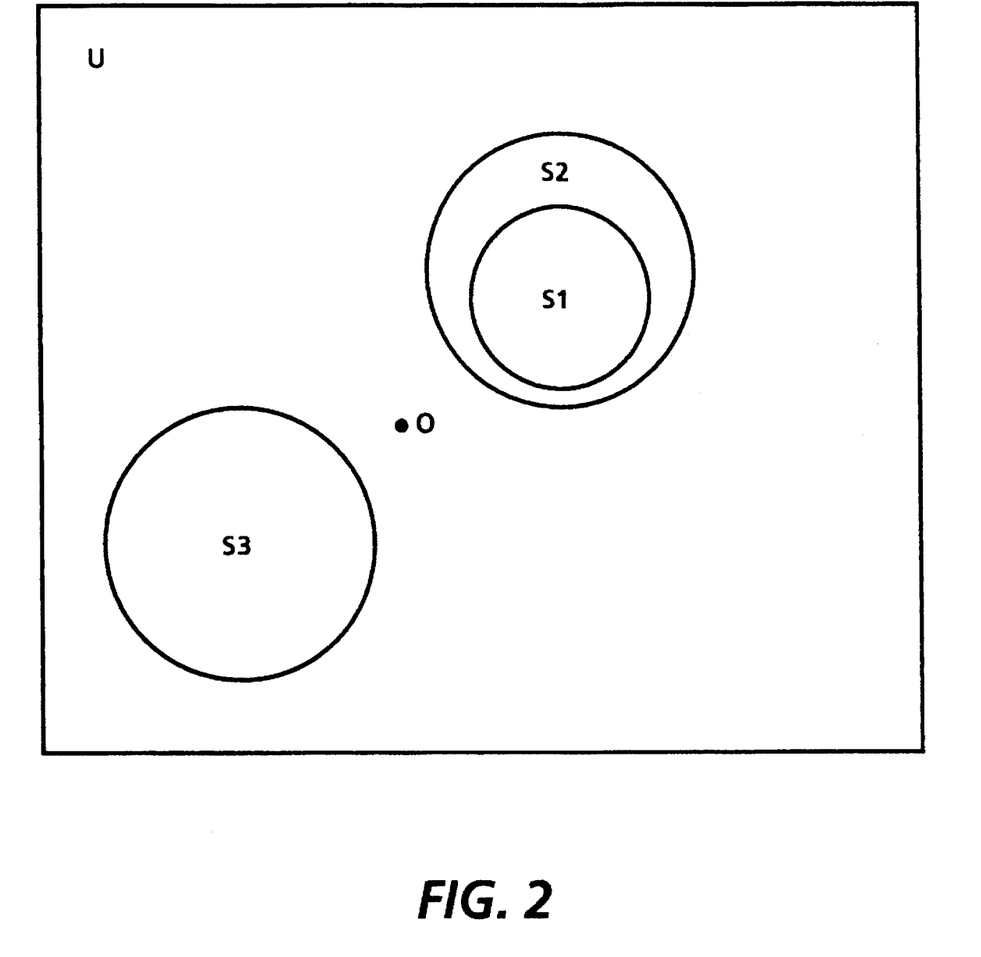
FIGS. 2 and 3 are set diagrams showing solution spaces for comparative search techniques relvant to the system of the present invention.

FIG. 2 shows how separate genetic algorithms using different representation schemes but the same evaluation function can work together on the same problem. In this diagram, the universal set U represents the search space defined by a complete, direct representation scheme. The point O represents the optimum solution. The sets S1, S2, and S3 represent the search spaces of three indirect, incomplete representation schemes for the same problem. Note that the points in the subsets are, on average, closer to point O than are the points in the rest of U. If four genetic algorithm programs (or four sets of programs) were run in parallel, one using the search space U and the other three using the search spaces S1, S2, and S3, then the programs running the subsets might find solutions near to O before the direct representation program did. If, while all of the programs are running in parallel, the best solution so far seen in each of the subset programs is periodically added to the population used by the program using representation U, then that program could reach O sooner than it would otherwise. Note that solutions generated by the program using representation S1 could also be migrated to the program using representation S2, but that solutions from the program using representation S3 could not be inserted into the populations maintained by programs S1 or S2; nor could solutions produced in S2 or U generally be inserted into the other programs' populations. This method of using several distinct representations that share the same evaluation function and phenotype allows the programmer to exploit the strengths of constrained representations (speed) and the strength of direct representations (precision) at the same time; furthermore, by running the programs with the different representations in parallel instead of serially, it is possible to avoid trying to decide if, for example, the program using S2 should be run before the program using S3. Also, if the best solution found in S2 and the best solution found in S3 were both placed in U, then recombination operators applied to the pair would be quite likely to produce new solutions that are nearer to the optimum solution O than either S2 or S3 can get by itself. Thus, if a complete, direct representation is provided, it can be used to combine solutions produced by genetic algorithms using other representation schemes, thereby exploiting the special advantages of each representation scheme.

The usefulness of direct, complete representations is not limited to combining the results of indirect genetic algorithms; since a complete representation can represent any solution, no matter how derived, a population that uses a complete representation scheme can admit solutions from non-genetic optimization problems, including, for example, the results of linear programming optimization, simulated annealing, or expert systems. It could also admit solutions produced directly by a human expert. The recombination operators of the genetic algorithm running the direct representation scheme will be able to merge solutions from all of these sources. At the same time, if any of the non-genetic optimization programs use the same representation scheme as do any of the genetic algorithm programs, then it will be possible for solutions to move back and forth between the compatible programs many times. For example, an evolved solution from a genetic algorithm program could be used as a seed for a simulated annealing program, and the results of the annealing process could be returned to the population of solutions maintained by the genetic algorithm for further evolutionary optimization.

Figure 3:
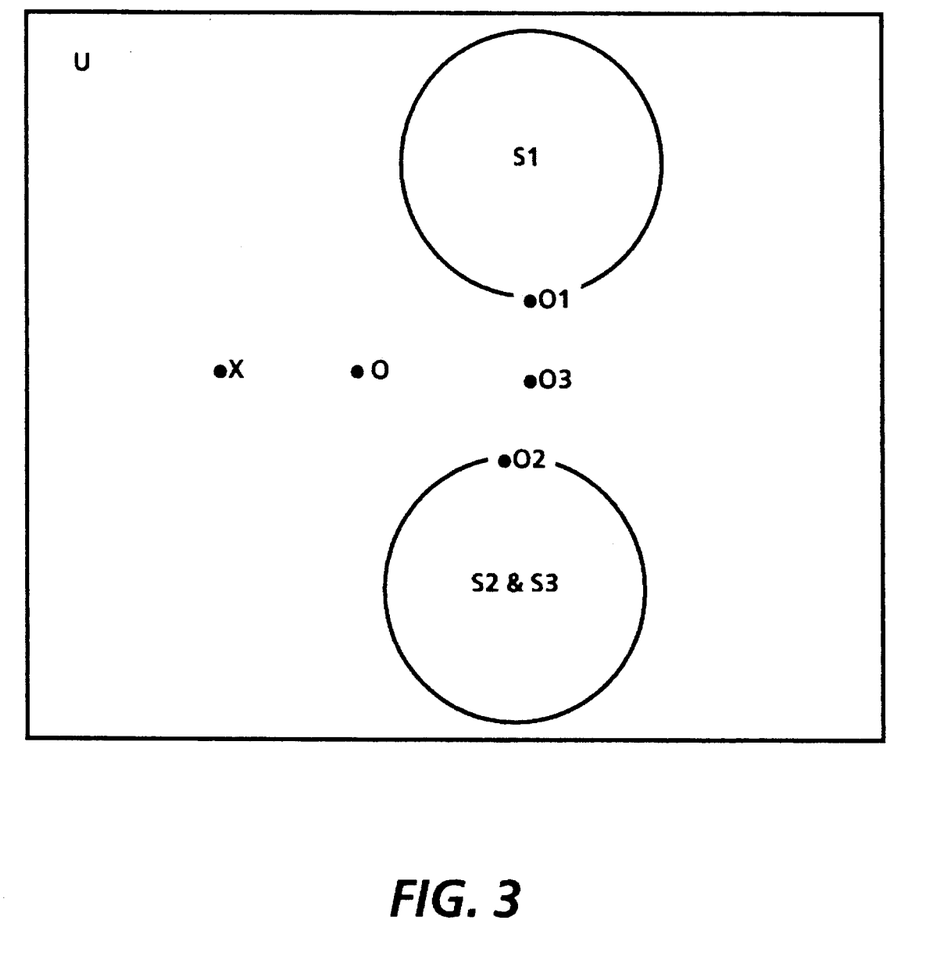

FIG. 3 shows how a genetic algorithm using a direct, complete representation scheme can combine solutions from various genetic algorithm and other sources to produce an optimal solution. In the Figure, U represents the search space of a genetic algorithm program using a complete representation scheme. S1 is the search space of a more constrained, indirect (and thus incomplete) representation scheme used by a second genetic algorithm. S2 is the search space of a third genetic algorithm using a different constrained representation scheme. S3 is the search space of a simulated annealing program that uses the same constrained representation scheme as the third genetic algorithm. Point X represents a solution designed by a human expert. If the program using S1 produces solution O1 (the best possible solution in 51) and S2 and S3 working together produce solution O2, then O1 and O2 can be introduced into U, the search space of the complete representation, and combined by the genetic operators of U to produce solution O3, which is nearer the optimum than either O1 or O2. This new solution can then be recombined with solution X to produce a new solution near to O, the global optimum. If all of the programs are run in parallel, with periodic movement of the current best solutions in each search space into the larger search spaces, then this sequence of recombinations can occur spontaneously, without the. designer explicitly deciding which programs should be run first or which solutions should be combined with which. The selection pressure provided by the evaluation function will ensure that computational effort is focussed on the best current solutions in each population, regardless of where those solutions were originally produced.

Turning now to the specific attributes of the present invention, the present invention relates to a system which integrates, by means of a plurality of computers, multiple simultaneous genetic algorithm techniques, coupled with an ability to complement a basic genetic algorithm technique with other search or optimization techniques. Thus, the system of the present invention facilitates integrating multiple genetic algorithm programs using diverse solution representations.

As used in the specification and claims herein, a "computer" shall be defined as a computing system which is capable of carrying out its intended function independently, without necessarily depending on, for instance, an external input of data to process. It is conceivable that a plurality of computers could in fact be part of a single physical entity, but if a "computer" can still perform its intended function (such as generating potential solutions in a given way) when the other "computers" it usually interacts with are turned off, then the computer is considered independent. Also, the specific embodiment of the invention shown in FIG. 4 is intended to illustrate the basic principles of the claimed invention; the specific configuration of various functions in a real-world system may vary depending the nature of the application being solved.

Figure 4:
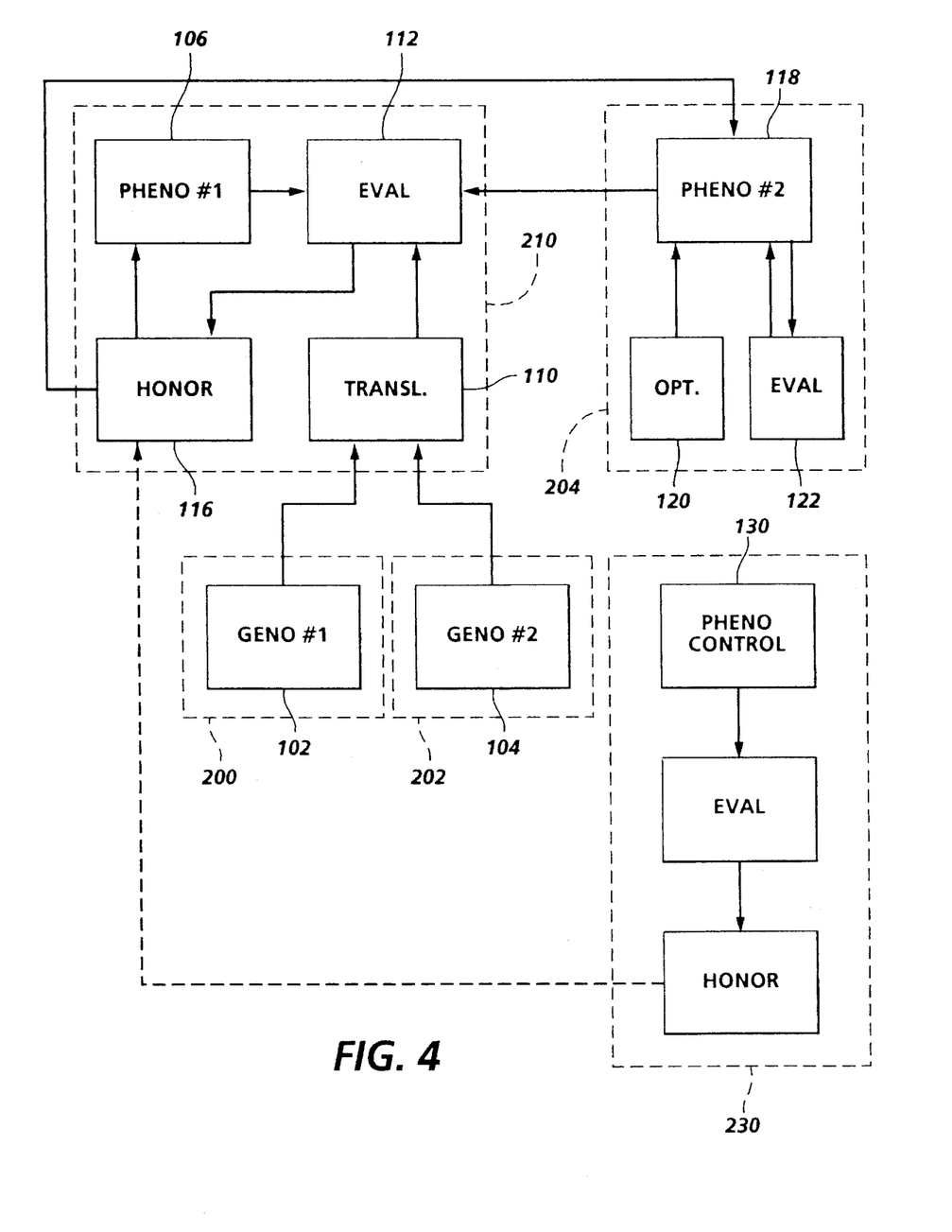
FIG. 4 is a systems diagram of a set of largely independent computers which are adapted to embody the system of the present invention.

In FIG. 4, programs 102 and 104 represent two independent programs executing the genetic algorithm on two different populations of solutions, each with its own indirect, constrained representation scheme. At the same time, there preferably exists another program, here shown as 106, which is carrying out a genetic algorithm process using a direct, complete representation scheme. All of these programs would ideally be running asynchronously. With each of its generations, each genetic algorithm program produces a new set of solutions, each solution being a potential best solution relative to the common evaluation function. In the case of the solutions being generated by program 106, these solutions will be generated as phenotypes that can be fed directly into the evaluation program 112 for ranking.

The constrained, indirect representation scheme programs 102 and 104, however, produce solutions in the form of genotypes, and in order to evaluate these genotypes along with the phenotypes from the population maintained by program 106, the genotypes must be translated into phenotypes of the same format used by programs 106 and 112. In this way, new solutions, whether from a direct phenotype source or translated from a genotype source, may be compared regardless of where they originally came from. To accomplish this translation, the successive generations of new genotype solutions from indirect representation program 102 and indirect representation program 104 are introduced from these populations into a translator function 110. This translator function 110 represents a computer, or portion of a computer, adapted to translate genotypes sent to it into the corresponding phenotypes. The translator 110 is preferably passive, in that it merely accepts genotype solutions of various types as they become available, and then sends them on to evaluation function 112. The evaluation function 112 is a computer or portion of a computer which applies the evaluation function algorithm to phenotype solutions presented to it. As with the translator function 110, the evaluation function should, in computer terms, be adapted to evaluate solutions as they become available from whatever ultimate source. This evaluation function 112 is crucial because this function determines which solutions survive and reproduce and which are lost. The results of a solution's evaluation are communicated to the originating program (the dashed lines in FIG. 4) so that the originating genetic algorithm can properly determine that solution's fate.

In the illustrated embodiment, the evaluation function 112 interacts with a constantly updated set of the phenotypes (and where appropriate, the genotypes) of the best solutions that have been produced so far, which are here referred to as inhabiting an "honor roll" buffer 116. Honor roll buffer 116 retains a number of the best solutions which have so far been produced, for example, the top ten to fifty solutions. The honor roll buffer 116 not only maintains a running tally of the best solutions, but is also used to send these solutions to other active populations, in order to seed these populations and cause them to focus on the most promising solutions. One technique for constructing a useful "honor roll" would be as follows: as solutions ultimately from various genotype and phenotype sources are output by the evaluation function, the best ten are retained in the honor roll buffer 116. As new solutions are evaluated, the score of each successive solution is compared to the solutions in the honor roll, and if a new solution is better than any of the solutions in the honor roll, it replaces it. Periodically, all or some of the solutions in the honor roll are introduced into the active populations. Populations that use a direct representation can accept immigrants from the honor roll no matter how they were produced, since all of the solutions in the honor roll have the same phenotype format. Populations that use indirect representation schemes can accept immigrants that came from other populations that use the same representation scheme or that use a more constrained version of the same representation scheme. This migration of honor roll solutions into the various active populations will typically be performed only once every 10 or more generations, since if migration is too frequent, all of the populations will tend to converge on the same small set of solutions; it is usually desirable that some diversity be maintained in the overall set of solutions to avoid prematurely focussing the search on the wrong part of the search space.

One direct representation population, shown as existing in a computer program (including a memory or access thereto) 106 in FIG. 4, is in this embodiment considered the "central" population for genetic algorithms. As can be seen in the diagram, this population can accept any of the seed solutions from the honor roll buffer 116, and therefore can be considered to be in the "vanguard" of the best solutions at any given time. As will be noted, the honor roll solutions received by the central population ultimately come from any and all sources in the whole system, either from translated indirect representation solutions or from other direct representation populations. Other programs that use a direct representation scheme may differ from the central population in various ways. For example, there is shown a different direct representation population in program 118, which may also operate with genetic algorithms, or may instead (or in addition) rely on various non-genetic-algorithm search or optimization techniques in order to obtain new solutions which may be evaluated and, if they are good enough, be added to the honor roll buffer 116. Possible non-genetic-algorithm techniques that might be used include such hill-climbing (or gradient descent) techniques as taking certain of the variables within each solution, and systematically manipulating each one (for example, by progressively multiplying a particular variable in the solution by a certain factor). If it turns out, after application of the evaluation function, that an improved solution results, then the altered solution can replace the original one. Another option for alternative optimization techniques would be some sort of "expert system" related to the actual application.

The dotted line separating the various system elements in FIG. 4 emphasize an important feature of the claimed invention: the fact that different populations and optimization techniques may be carried out by independent computers, which can be activated or inactivated at will. It will be noted, for example, that genotype population #1 in memory 102 is activated (caused to form new individual solutions) within an independent computer denoted by the dotted line marked 200, and genotype population #2 in memory 104 is activated within a computer 202 which may be completely independent from computer 200. Similarly, the phenotype population #2, in its own memory 118, and its associated hillclimbing algorithm 120, are also disposed on a separate independent computer, here shown as 204. Phenotype population #2 may also have associated therewith its own evaulation function 122, which may or may not be identical to the main evalutaion function 112.

A central computer, generally indicated as 210, here includes only the translator 110, evaluation function computer 112, honor roll buffer 116, and the phenotype population #1 in buffer 106. This central computer 210 need be the only computer that has to function throughout the whole genetic algorithm process.

The computers 200, 202, and 204 are intended to be more or less independent of central computer 210, in the sense that central computer 210 can still carry out genetic algorithm processes at least with phenotype population #1, even if the other computers 200, 202, and 204 are at various times "off." In real world applications, there is always a relatively high chance that one of the computers 200, 202, or 204 may not be on all the time, because large-scale genetic algorithm applications often rely on "borrowed" computer power from other hardware, which is not otherwise in use, in order to contribute to the entire process. Because the entire process is broken up into discrete modules, each module running on an independent computer, if one or another of the computers 200, 202, or 204 is for the moment out of action with respect to the whole genetic algorithm process, the process as a whole will not come to a stop. Indeed, in the long run, the fact that different computers are off at various times will not matter. The purpose of the computers 200 and 202 is to constantly come up with new genotype solutions for translation and evaluation in the central computer 210; as mentioned above, the translator 110 within computer 210 merely accepts these genotype solutions as the computers 200 and 202 present them. If computer 200 or 202 or both are out of action at a given time, the translator 110 will simply wait until they come up with more solutions. Because the central computer 210 retains the memory 102 which holds the phenotype population #1, which is by its nature in the vanguard of best solutions at a given time, the lack of new input from the genotype populations will merely represent a set of lost opportunities for new and possibly useful solutions, a straightforward genetic algorithm process can still take place with only the phenotype population #1 and the evaluation function.

When the central computer 210 is "alone," that is, when no other computers are contributing potential solutions to it, the phenotype population may operate under a relatively straightforward process with the evaluation function, such as a discarding of the bottom half of the population with each new generation. The use of the honor roll buffer 116 may still come into play, for example, for replicating particularly good solutions to seed the population. However, the use of the honor roll buffer 116 is probably most useful when receiving immigrants from the computers 200, 202, and 204. For the various reasons mentioned above, it is common that genotype solutions may be more useful in getting to the general area of the most likely global optima most quickly, and cutting through the large proportion of manifestly bad solutions. On the other hand, the more cumbersome phenotype process may be more useful for fine tuning, once the general high ground is determined. Simultaneously, hillclimbing techniques applied to the phenotype may also be good at fine tuning.

One variant of the system of the present invention which may be useful in situations of particularly high ignorance is to provide a control phenotype population, here shown as 130, which is not affected at all by the genotype solutions or the hillclimbing techniques, and which serves as an experimental control to make sure that problems in, for example, one or more genotype representation schemes do not cause perverse results which may result if the small insight that permitted the creation of the genotype population turns out to be mistaken. If it happens that the control phenotype population is just as good as coming up with successful solutions at one or more of the genotype populations, then there would be reason to believe, for future applications, that that particular genotype population is counterproductive. Such a control system would preferably be placed on its own computer 230, although it would be apparent to provide means for a periodic comparing steps between the control and the "main" genotype population, such as in the honor roll buffer 116, as shown by the dotted line 131.

The various functions shown as boxes in FIG. 4 could all be executed on the same physical computer, or could all be run on different physical computers, or could each be run distributed across several physical computers, so long as the different programs can communicate with each other as needed. The individual programs could thus be implemented as separate processes on a single multi-tasking computer, or they could each be run on separate workstations linked on a LAN, or they could be run on the nodes of a massively parallel supercomputer, or any combination of these options, without any important change to the framework outlined above.

In summary, the system of the present invention, by virtue of its decentralized management of genetic algorithm populations, represents a synergy of two powerful concepts. First, the system of the present invention permits an integration of multiple representation schemes and optimization techniques, to ensure more robust solutions, both in terms of relative speed toward convergence coupled with the "open mind" effect of multiple representation schemes. Because the different representation schemes and optimization techniques are distributed over various independent computers, which are by and large independent of each other, the entire program can be centrally coordinated and performed by different computers at different times, as computer time becomes available. The integrated technique of the present invention, then, represent a significant advancement in both mathematical robustness and practical convenience.

While the invention has been described with reference to the structure disclosed, it is not confined to the details set forth, but is intended to cover such modifications or changes as may come within the scope of the following claims.

I claim:

1. A system for selecting a solution, comprising:
    a first computer, for generating a first population of solutions, the first population of solutions being of a first representation scheme;
    a second computer, for generating a second population of solutions, the second population of solutions being of a second representation scheme;
    a translator for translating solutions of the second representation scheme into equivalent solutions of the first representation scheme;
    means for introducing solutions from the second population of solutions into the first population of solutions; and
    means for evaluating solutions of the first population of solutions according to a preselected evaluation function.

2. The system of claim 1, wherein the first computer is capable of generating solutions independently of the second computer.

3. The system of claim 1, wherein the first computer generates new solutions by applying a genetic algorithm technique to an initial population of solutions and selecting a subset of the new solutions and the initial solutions according to the evaluation function, the subset becoming an initial population of solutions for a subsequent application of the genetic algorithm technique.

4. The system of claim 1, further comprising an optimizing computer for generating new solutions by applying an optimization technique to a solution in a population of solutions and introducing said new solutions to the evaluation means.

5. The system of claim 4, wherein the optimizing computer replaces the solution in the population with an optimized solution according to the optimization technique if the optimized solution results in a better evaluation than the solution according to the evaluation function.

6. The system of claim 4, further comprising means for introducing optimized solutions from the optimizing computer into the first population of solutions.

7. The system of claim 1, further comprising a buffer for retaining a set of highest-evaluated solutions from the first population of solutions.

8. The system of claim 7, further comprising means for introducing solutions from the set of highest-evaluated solutions into the first population of solutions.

9. The system of claim 8, further comprising means for introducing a plurality of ,replicated solutions from the set of highest-evaluated solutions into the first population of solutions.

10. The system of claim 7, further comprising
    an optimizing computer for generating new solutions by applying an optimization technique to a solution in a population of solutions; and
    means for introducing solutions from the set of highest-evaluated solutions into the optimizing computer.

* * * * *